United States Patent
Nelson

(10) Patent No.: US 6,641,087 B1
(45) Date of Patent: Nov. 4, 2003

(54) ANTI-HIJACKING SYSTEM OPERABLE IN EMERGENCIES TO DEACTIVATE ON-BOARD FLIGHT CONTROLS AND REMOTELY PILOT AIRCRAFT UTILIZING AUTOPILOT

(75) Inventor: Douglas G. Nelson, Lemon Grove, CA (US)

(73) Assignee: Cubic Defense Systems, Inc., San Diego, CA (US)

( * ) Notice: Subject to any disclaimer, the term of this patent is extended or adjusted under 35 U.S.C. 154(b) by 0 days.

(21) Appl. No.: 09/974,545

(22) Filed: Oct. 9, 2001

(51) Int. Cl.$^7$ ............................................... B64D 11/00
(52) U.S. Cl. ................................................... 244/118.5
(58) Field of Search ..................................... 244/118.5

(56) References Cited

U.S. PATENT DOCUMENTS

| | | | | |
|---|---|---|---|---|
| 3,704,845 A | * | 12/1972 | Ord .............................. | 244/121 |
| 3,796,398 A | * | 3/1974 | Eilertson ..................... | 244/139 |
| 3,811,643 A | * | 5/1974 | Pisso .......................... | 244/1 R |
| 3,841,328 A | * | 10/1974 | Jensen ........................ | 128/218 R |
| 4,775,116 A | * | 10/1988 | Klein ......................... | 244/76 R |
| 4,811,230 A | * | 3/1989 | Graham et al. ................ | 701/15 |
| 5,057,834 A | * | 10/1991 | Nordstrom ................... | 180/272 |
| 5,526,265 A | * | 6/1996 | Nakhla ........................ | 244/183 |
| 5,531,402 A | * | 7/1996 | Dahl .......................... | 244/75 R |
| 5,695,157 A | * | 12/1997 | Coirier et al. ............... | 244/175 |
| 5,712,785 A | * | 1/1998 | Mok et al. ................... | 244/183 |
| 5,774,818 A | * | 6/1998 | Pages ......................... | 244/175 |
| 6,064,939 A | * | 5/2000 | Nishida et al. .............. | 244/175 |
| 6,314,361 B1 | * | 11/2001 | Yu et al. ..................... | 701/117 |

FOREIGN PATENT DOCUMENTS

| | | | | |
|---|---|---|---|---|
| FR | 2107798 | * | 4/1971 | ........... G08B/15/00 |
| FR | 2192343 | * | 7/1972 | ........... G08B/15/00 |
| FR | 2584842 | * | 1/1987 | ........... G08B/21/00 |
| FR | 2584842 A1 | * | 1/1987 | ................. 244/1 R |

OTHER PUBLICATIONS http://www.flightstat.org/index.htm.*
http://atrs.arc.nasa.gov/atrs/95/kaufmann/950066/950066.refer.new.html, DGPS Automatic landing system, Jun. 1995, ".pdf" file, whole document 479 pages and abstract.*
Cetrek Ltd., 1994, 737 Autopilot system, whole document.*
http://www.af.mil/news/factsheets/RQ_1_Predator_Unmanned_Aerial.html, all.*
Honeywell's Differential GPS Satellite Landing System, from Sep. 1996 issue of Avionics News Magazine.*
http://www.af.mil/news/factsheets/RQ_1_Predator_Unmanned_Aerial.html, all.*
http://www.fas.org/irp/doddir/usaf/conops_uav/part06.htm, all.*
Steve Kirsch, Sep. 20, 2001, http://www.skirsch.com/politics/plane/disable.htm, all.*

* cited by examiner

Primary Examiner—Peter M. Poon
Assistant Examiner—Timothy D. Collins
(74) Attorney, Agent, or Firm—Michael H. Jester

(57) ABSTRACT

In an anti-hijacking system for autopilot equipped aircraft, a transceiver communicates with at least one remote guidance facility. A panic button is activated by flight crew in case of hijacking. A manager is coupled to the transceiver and the panic button, as well as existing avionics including the aircraft's master computer and autopilot. Optionally, a relay is coupled between the pilot controls and selected aircraft flight systems. The manager recognizes predetermined override inputs, such as activation of the panic button or receipt of override signals from the remote guidance facility. Responsive to the override input, the manager deactivates on-board control of selected aircraft flight systems and the autopilot system, and directs the autopilot to fly the aircraft to a safe landing. Flight routing and landing instructions are obtained from the remote guidance facility, or by self-evaluating nearby airports in view of the aircraft's position and various preestablished criteria.

55 Claims, 3 Drawing Sheets

ANTI-HIJACKING SYSTEM OPERABLE IN EMERGENCIES TO DEACTIVATE ON-BOARD FLIGHT CONTROLS AND REMOTELY PILOT AIRCRAFT UTILIZING AUTOPILOT

BACKGROUND OF THE INVENTION

1. Field of the Invention

The present invention relates to piloting of commercial aircraft. More particularly, the invention concerns an anti-hijacking system responsive to activation of a panic button aboard the aircraft or by remote override signal to deactivate the pilot's normal flight controls and program the autopilot system to fly the aircraft to a safe landing.

2. Description of the Related Art

Aircraft hijacking has been a longstanding problem that continues to haunt airlines and the flying public. At best, hijacking merely inconveniences an aircraft's passengers, flight crew, airline company, and people waiting for the flight to arrive. At worst, hijacking can cause substantial loss of life and property aboard the aircraft and on the ground.

Responding to the ever present threat of hijacking, airports, airlines, and government authorities are implementing different anti-hijacking measures. In airports, numerous measures are taken to screen passengers and their luggage for weapons and dangerous materials. Security personnel oversee service facilities, jet ways, and aircraft parking areas, enforcing security policies that prevent unauthorized persons from entering. Thousands of flights are safely conducted each day, a testament to the implementation or perhaps the deterrent value of these anti-hijacking measures. On rare occasion, though, hijackings still occur.

Guarding against the potential failure of early stage security measures, airlines are using various later stage, on-board anti-hijacking measures. For example, cockpit doors are locked during flight to prevent intrusion by passengers. As another example, some flights carry an armed, plainclothes federal air marshal, specifically trained to stop hijackers. As still another example, when a pilot sets the aircraft transponder to squawk "7500," this alerts air traffic controllers to a hijacking in progress. Still, these measures offer little resistance to a hijacking in progress. Hijackers of sufficient motivation, numbers, brutality, and intimidation can still appear aboard an aircraft despite existing security measures, in which case the flight crew and passengers are utterly helpless. Even when locked, lightweight cockpit doors can be disabled or smashed. Air marshals cannot be present in every flight due to government budget limitations. Although use of the "7500" transponder code alerts air traffic controllers to the hijacking, this does nothing to stop a hijacking in progress, and knowledgeable hijackers have been known to disable aircraft transponders.

As shown above, existing measures are not always sufficient to prevent armed hijackers from boarding commercial aircraft. And, once aboard an aircraft, hijackers of sufficient motivation can wreak havoc with little or no meaningful resistance. Few defensive measures are available to deter or inhibit terrorists from achieving their objectives once the aircraft is airborne and the terrorists have assumed control. Clearly, then, the state of the art is plagued with certain unsolved problems that stymie efforts to provide a completely safe flying environment.

SUMMARY OF THE INVENTION

The anti-hijacking system of this invention is utilized with aircraft having an autopilot system. This system includes a transceiver to communicate with remote guidance facilities such as ground control or satellite relay. A panic button is provided for flight crew to manually activate the invention's anti-hijacking measures. A manager is coupled to the transceiver and panic button, as well as existing avionics such as the aircraft's master computer and autopilot. The invention may also utilize a mechanical or electrical relay, coupled between the pilot controls and the aircraft flight systems.

Initially, the manager waits for an override input such as activation of the panic button or receipt of a predetermined override signal from the remote guidance facilities via the transceiver. Then, responsive to the override input, the manager takes certain counter-hijacking measures, such as taking control of aircraft flight systems, deactivating on-board control of the autopilot system, and programming the autopilot to fly the aircraft to a safe landing. The manager may obtain flight routing and landing instructions from the remote guidance facilities via the transceiver, in which case the manager transmits flight condition data (such as airspeed, altitude, fuel remaining, etc.) to the remote guidance facilities to assist humans or computers in remotely computing the optimal flight path and landing instructions for the aircraft. In another embodiment, the manager determines the optimal flight routing and landing instructions by evaluating nearby airports in view of the aircraft's position and other preestablished criteria. As an enhancement to the foregoing embodiments, the remote guidance facilities may also transmit manual commands for the manager to individually implement by manipulating the aircraft flight systems. In preparation for possible loss of the aircraft, the manager may additionally assemble and upload flight data recorder and cockpit voice recorder data to the remote guidance facilities via the transceiver.

The foregoing features may be implemented in a number of different forms. For example, the invention may be implemented to provide a method to prevent aircraft hijacking by deactivating pilot controls and forcing the aircraft's autopilot system to fly the aircraft to a safe landing. In another embodiment, the invention may be implemented to provide an apparatus with hardware components and interconnections assembled and configured to prevent hijacking in this manner. In still another embodiment, the invention may be implemented to provide a signal-bearing medium tangibly embodying a program of machine-readable instructions executable by a digital data processing apparatus to perform anti-hijacking measures as described herein. Another embodiment concerns logic circuitry having multiple interconnected electrically conductive elements, such elements configured to conduct anti-hijacking operations as described herein.

The invention affords its users with a number of distinct advantages. In general, the invention counteracts otherwise successful hijackings by forcibly assuming control of the aircraft, and overriding pilot controls in the cockpit. This prevents hijackers from flying the aircraft, and also prevents pilots from flying the aircraft according to hijackers' directions. Also, widespread, public implementation of the invention's anti-hijacking system deters hijackers by informing them of the difficulty of carrying out a successful hijacking. Another benefit of the invention is its flexibility—anti-hijacking measures may be initiated locally by personnel aboard the aircraft, or remotely by personnel at the remote guidance facility. In the case where remote personnel assume control of the aircraft, the anti-hijacking system transmits various aircraft condition data to remote personnel to aid them in planning the aircraft's routing and landing. One optional feature of the invention disables the aircraft's communications equipment, eliminating any chance for the hijackers to communicate demands or threats to people on the ground. Because of its ability to safely fly and land the aircraft, the invention is also beneficial in the event that the pilots are dead or incapacitated due to hijacking, unforeseen cabin depressurization, midair collision, or any other reason. The invention also provides a number of other advantages and benefits, which should be apparent from the following description of the invention.

DETAILED DESCRIPTION

Figure 1:
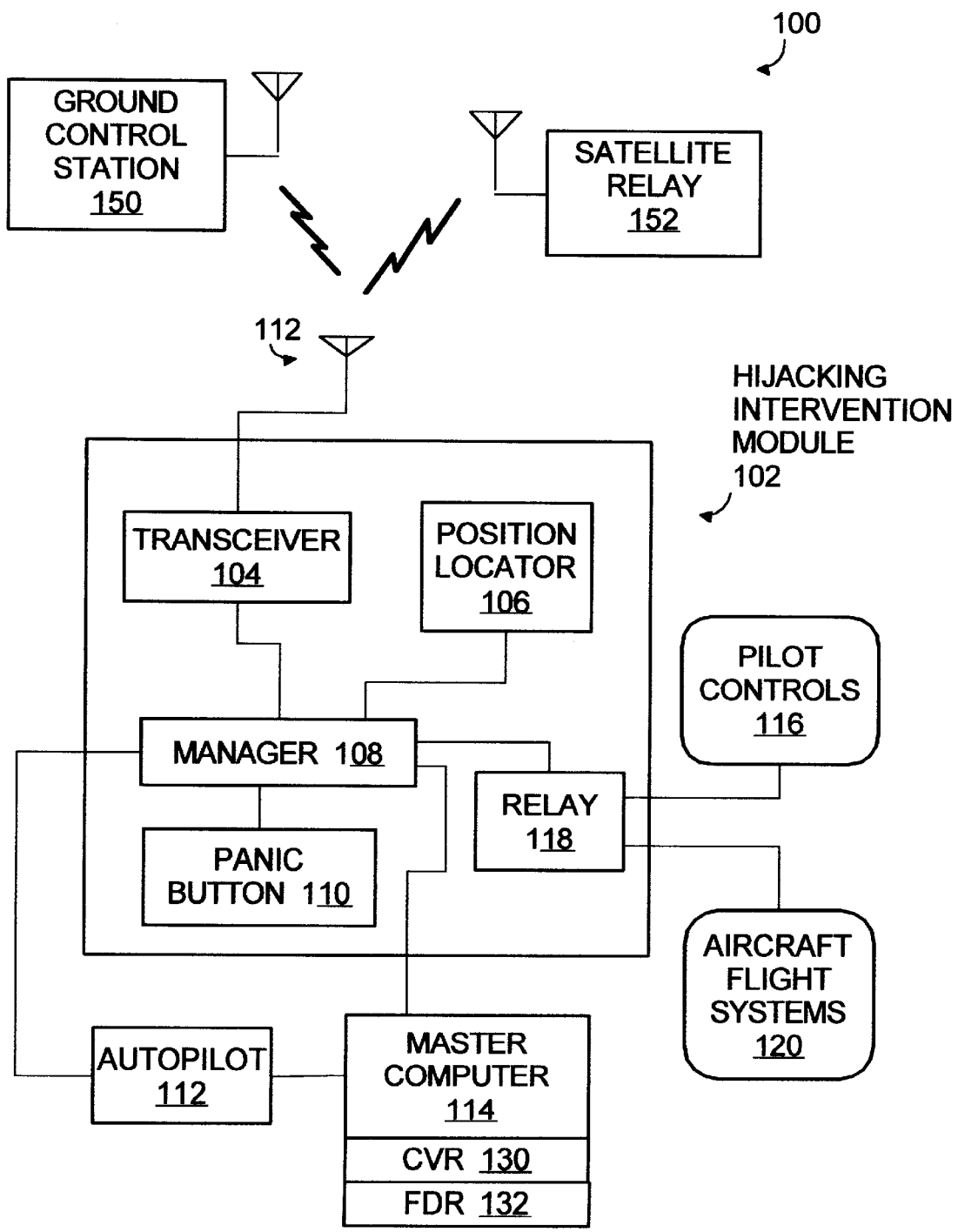
FIG. 1 is a block diagram of the hardware components and interconnections of an anti-hijacking system according to the invention.

The nature, objectives, and advantages of the invention will become more apparent to those skilled in the art after considering the following detailed description in connection with the accompanying drawings.

HARDWARE COMPONENTS & INTERCONNECTIONS

System Components On Board Aircraft

One aspect of the invention concerns an anti-hijacking system, which may be embodied by various hardware components and interconnections. One example is illustrated by the anti-hijacking system 100 of FIG. 1. As shown, the system 100 includes some existing aircraft components as well as some newly added components. In addition to retrofitting, the concepts of this invention may also be integrated into avionics for implementation in new aircraft as well. Broadly, the system 100 includes a hijacking intervention module 102 that is retrofitted to an aircraft's existing avionics, such as an autopilot 112, master computer 114, pilot controls 116, aircraft flight systems 120, cockpit voice recorder (CVR) 130, and flight data recorder (FDR) 132. The module 102 communicates with remote guidance facilities such as a ground control station 150 and satellite relay 152 to perform functions such as alerting ground control personnel to a hijacking in progress, receiving flight routing and landing instructions, sending aircraft condition information, and preserving FDR and CVR data by sending it to the ground control station.

As mentioned above, some existing aircraft components include the pilot controls 116, aircraft flight systems 120, master computer 114, autopilot 112, CVR 130, and FDR 132. The pilot controls 116 shown in FIG. 1 are those controls that the module 102 locks out to prevent hijacking of the aircraft. Therefore, at minimum the pilot controls 116 include the control yoke, rudder pedals, engine controls including condition levers or other power levers, flap input lever, and landing gear selectors. The pilot controls 116 may additionally include trim inputs, fuel selectors and transfer pumps, and any other input for configuring any feature of the aircraft that is subject to control by the autopilot 112. Optionally, the pilot controls 116 may also include aircraft features not subject to autopilot control, as described below. The aircraft flight systems 120 represent the servos, motors, relays, and other mechanisms to carry out the actions directed by the pilot controls 116. For example, the aircraft flight systems 120 include servos to move the ailerons according to control yoke position. The master computer 114 may comprise a central or subsidiary processing unit, one or more digital data processing modules, busses, communication channels, input/output devices, or other source of aircraft condition information such as airspeed, fuel remaining, altitude, position, attitude, heading, engine condition, or other information helpful in assuming remote control of the aircraft. Although such features may be implemented by a different component, the computer 114 as illustrated also controls the aircraft flight systems 120 and therefore has the ability to functionally disconnect the pilot controls 116 from the aircraft flight systems 120. The autopilot 112 comprises a system for automatically controlling the aircraft's configuration (such as attitude, power setting, flaps, etc.) according to navigation and landing instructions entered into the autopilot 112.

As mentioned above, the module 102 is a component newly added to the existing flight systems 112, 114, 116, 120, 130, 132. The module 102 includes a transceiver 104, position locator 106, manager 108, panic button 110, and relay 118. The transceiver 104 comprises one or more transmitter/receiver units capable of exchanging signals with the ground control station 150 directly or by satellite relay 152. The transceiver 104 may utilize any bandwidth, modulation, and communications format suitable for the type of signals being transmitted. To ensure security of transmissions, encryption or other suitable protection may be implemented by the transceiver 104 itself, or by the manager 108 encrypting/decrypting data to/from the transceiver 104. The transceiver 104 utilizes one or more antennae 112 as needed. The position locator 106 comprises a source of positional information such as a global positioning system (GPS) unit, long range navigation (LORAN) unit, inertial navigation unit, or other self-locating device, or an interface to a preexisting position locating device aboard the aircraft. Another component of the module 102 is the panic button 110. Although the familiar and descriptive phrase "panic button" is used for clarity of illustration, no limitation is intended thereby, as the panic button 110 may comprise a button or various other devices such as a switch, dial, lever, handle, touch screen, pedal, or other input device activated (in case of hijacking) by flight crew or other authorized personnel aboard the aircraft. The panic button 110 is constructed and located for easy and fast activation, one particular example being a toggle switch with a flip-up cover to protect the toggle switch from inadvertent activation. As another example, the panic button 110 may be embodied by one or multiple remote control units entrusted to flight crew, flight attendants, federal air marshals, or other persons aboard the aircraft with sufficient authority. To further enhance security, the panic button 110 may condition activation upon entry of a passcode or upon user identification achieved through voice recognition, retina scanning, fingerprint analysis, etc. The relay 118 comprises an electrical, mechanical, electro mechanical, electromagnetic, semiconductor, or other switch to electrically connect and disconnect the pilot controls 116 and aircraft flight systems 120.

The manager 108 comprises a processor, microprocessor, logic circuit, microcomputer, application specific integrated circuit (ASIC), circuit board, or other circuitry configured to oversee operation of the hijacking intervention module 102. In this respect, the manager 108 is coupled to the transceiver 104, position locator 106, relay 118, and panic button 110. The manager 108 is also coupled to the autopilot 112, master computer 114, CFR 130, and FDR 132.

Depending upon desired ease of retrofitting, cost guidelines, and other requirements of operation and installation, the hijacking intervention module 102 may include a number of additional components. For instance, the module 102 may include fire monitoring equipment, circuit breakers, and other protective circuitry in a tamper-proof location separate from the aircraft's existing avionics. Additionally, the module 102 may include a selectively activated mechanism to distract and/or disable hijackers in the cockpit in response to an override input, with some examples being emission of a sleep-inducing gas, depressurization of the cabin, or any other means to distract and/or disable hijackers.

Remote Guidance Facilities

Depending upon its mode of operation (described in greater detail below), the module 102 may interact with remote guidance facilities such as the illustrated ground control station 150. Broadly, the ground control station 150 is equipped to initiate remote control of the aircraft equipped with the hijacking intervention module 102, and thereafter provide the aircraft with flight routing and landing instructions. Accordingly, the ground control station 150 is manned by carefully screened personnel possessing sufficiently high security clearance. The station 150 may be operated by the government, by a government contractor, or by an airline operating a fleet of aircraft equipped with hijacking intervention modules. The ground control station 150 includes communication links to air traffic control, government security authorities, airlines, weather services, and other entities that might be helpful in investigating, confirming, and responding to a hijacking situation. The module 102 and ground control station 150 may communicate directly, or through a network of remote communications outlets (not shown), and/or by satellite relay 152. The satellite relay 152 is provided for relaying communications between hijacking intervention modules that are unable to communicate with the ground control station or its remote communications outlets due to distance, signal noise, equipment failure, and the like. In one example, the satellite relay 152 may utilize the IRIDIUM satellite network.

Although a single ground control station 150 is described for ease of illustration, the ground control station 150 may comprise multiple such stations for system redundancy, optimal responsiveness, or other reasons. Moreover, the ground control station need not be present on the ground, as such equipment may be in airborne flight, orbit, or other non-ground site. For example, as an alternative to using the satellite relay 152 to forward communications between aircraft and the ground control station, the satellite relay 152 itself may contain personnel and/or computer equipment sufficient to act in lieu of the ground control station. For ease of reference, the ground control station, satellite relay, and/or ground control type facilities located elsewhere than the ground are referred to as "remote guidance facilities."

Exemplary Digital Data Processing Apparatus

As mentioned above, the manager 108 may be implemented in various forms. As one example, the manager 108 may comprise a digital data processing apparatus, as exemplified by the hardware components and interconnections of the digital data processing apparatus 200 of FIG. 2.

The apparatus 200 includes a processor 202, such as a microprocessor, personal computer, workstation, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement the manager 108. Depending upon the particular requirements of the application in the areas of speed, expense, tooling costs, and the like, this logic may be implemented by constructing an ASIC having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Having described the structural features of the present invention, the operational aspect of the present invention will now be described. As mentioned above, the operational aspect of the invention generally involves deactivating the normal pilot controls and programming the autopilot system to forcibly fly the aircraft to a landing in response to an override input such as receipt of a remotely issued override signal or manual activation of a panic button aboard the aircraft.

Signal-Bearing Media

Figure 2:
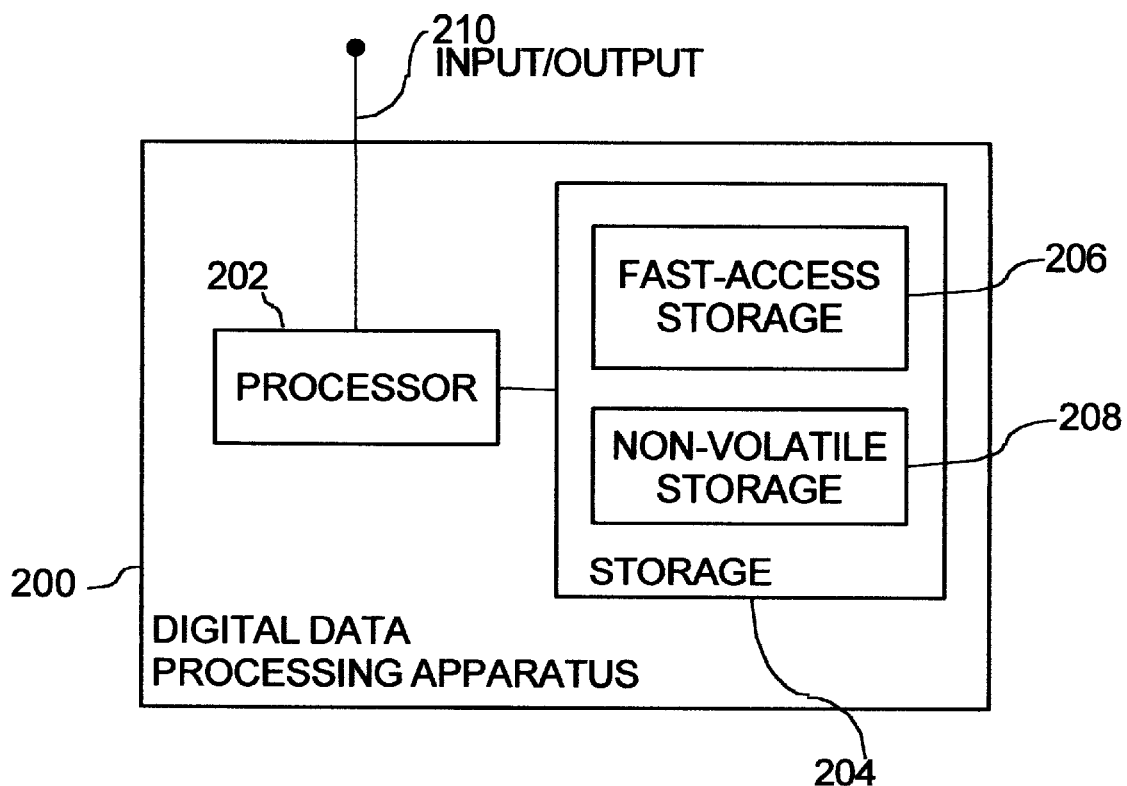
FIG. 2 is a block diagram of a digital data processing machine according to the invention.
Figure 3:
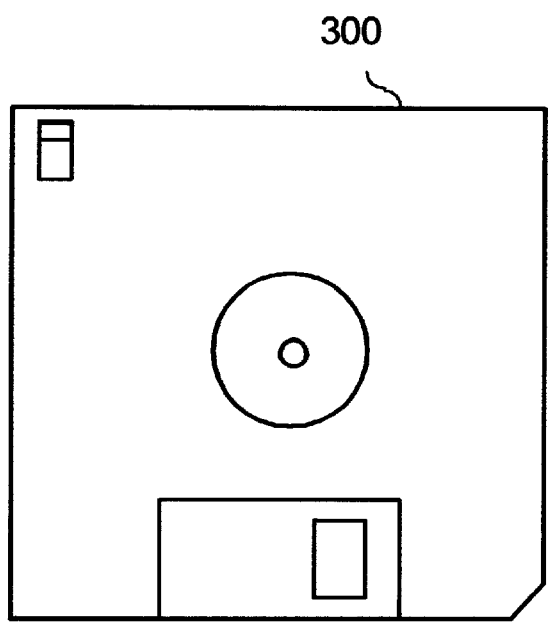
FIG. 3 shows an exemplary signal-bearing medium according to the invention.

In embodiments where the operation of the manager 108 is governed by one or more machine-executed program sequences, they may be implemented in various forms of signal-bearing media. In the context of FIG. 2, this signal-bearing media may comprise, for example, the storage 204 or another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media. Some examples include direct access storage (e.g., a conventional "hard drive," redundant array of inexpensive disks ("RAID"), or another direct access storage device ("DASD")), serial-access storage such as magnetic or optical tape, electronic non-volatile memory (e.g., ROM, EPROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, the method aspect of the invention may be implemented using logic circuitry, without using a processor to execute instructions. In this embodiment, the logic circuitry is implemented in the manager 108, and is configured to perform operations to implement the method of the invention. The logic circuitry may be implemented using many different types of circuitry, as discussed above.

Overall Sequence of Operation

Figure 4:
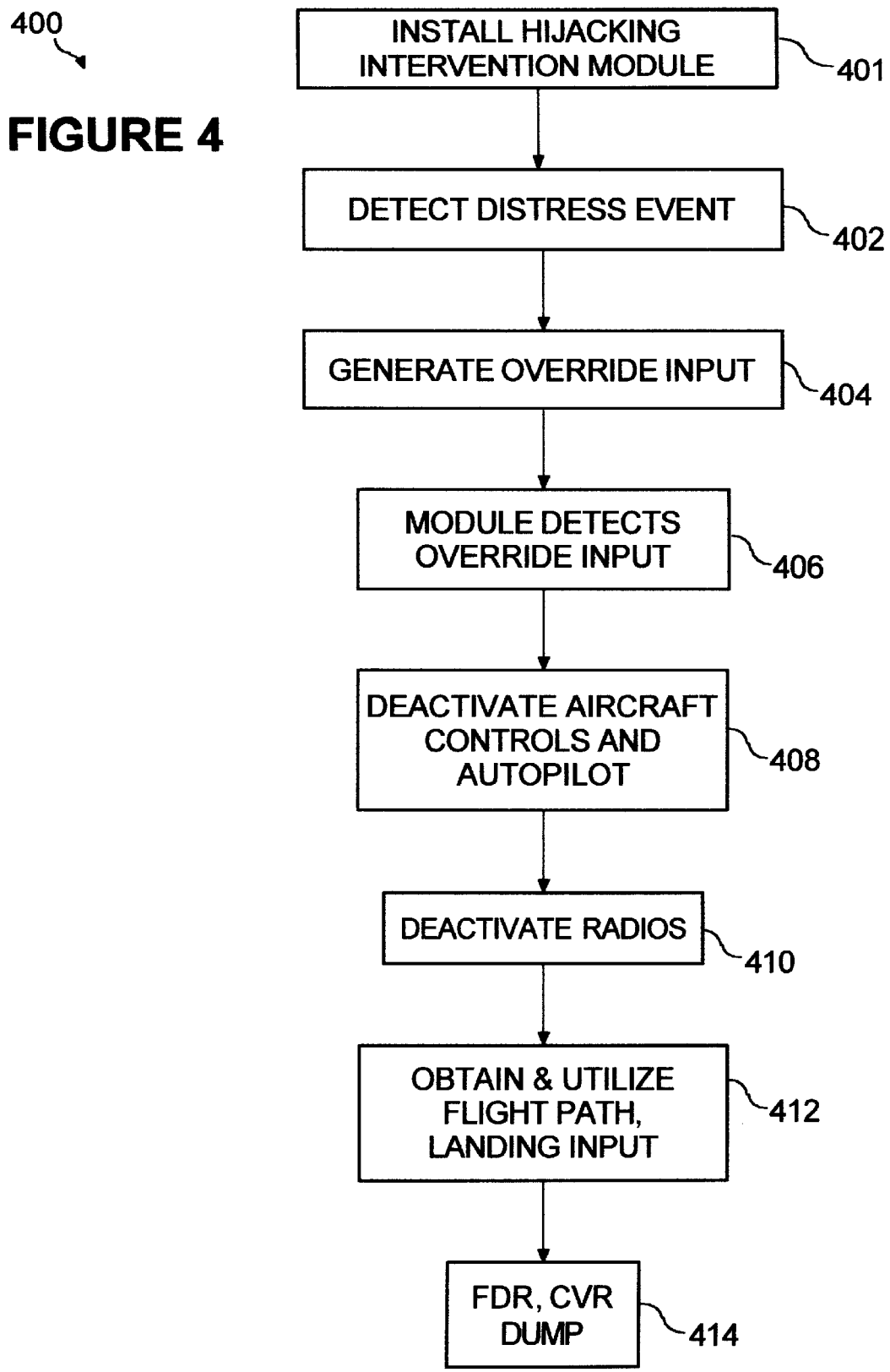
FIG. 4 is a flowchart of a sequence for preventing hijacking by deactivating pilot controls and directing the aircraft's autopilot system to fly the aircraft to a safe landing, according to the invention.

FIG. 4 shows a sequence 400 to illustrate one example of the method aspect of the present invention. Broadly, this sequence serves to deactivate the pilots' normal flight controls and program the autopilot system to forcibly fly the aircraft to a landing in response to an override input such as receipt of a remotely issued override signal or manual activation of a panic button aboard the aircraft. For ease of explanation, the example of FIG. 4 is described in the context of the hijacking intervention module 102 described above.

The sequence 400 begins in step 401, where an airplane is retrofitted with the hijacking intervention module 102. This involves installation and connection of the module 102 to the existing aircraft components 112, 114, 116, 120, 130, 132. The module 102 may use electrical power from existing busses, or from a separate power supply. Alternatively, instead of retrofitting, the module 102 may be integrated and installed with new avionics, for example upon construction of the aircraft. In step 402, a "distress event" is detected by on board personnel (flight crew, flight attendants, federal air marshal, etc.) or ground control station personnel. This is any event sufficient to warrant remote control of the aircraft, such as hijacking or incapacity of the flight crew. The specific requirements of a "distress event" may be promulgated by federal authorities, or by airline operating procedures, for example. People on board the aircraft detect distress events by personal observation. Personnel at the ground control station 150 detect distress events by all available means. For example, air traffic control may advise ground control personnel that an aircraft is being hijacked after having observed a transponder squawk code of "7500" or the transponder being turned off without explanation, received notification from flight crew over aircraft radios, observed an aircraft behaving erratically or flown off course, etc. As another example, the ground control station may publish a national hijacking alert telephone number for use by passengers in aircraft equipped with airborne telephones. As still another example, ground control personnel may learn of hijacking by using video cameras to remotely monitor activity on the flight deck.

In step 404, the module 102 is activated by generating an override input. If the distress event was recognized on-site, step 404 involves somebody aboard the aircraft activating the panic button 110. If the distress event was recognized by ground control personnel, step 404 involves the ground control station 150 transmitting an override signal to the module 102. Depending upon signal strength, noise, and other factors, the transceiver 104 may receive the override signal directly from a ground control station 150 or via the satellite relay 152.

After step 404, the module 102 detects the override input (step 406), namely, the panic button 110 having been activated or an override signal having been received from the ground control station 150. In the event the panic button 110 was activated, step 406 involves the manager 108 receiving a representative electrical signal from the panic button 110. In the event the override signal arrived from the ground control station 150, step 406 involves the transceiver 104 receiving this signal from the ground control station 150 and forwarding it to the manager 108. In this respect, the transceiver 104 continually monitors the airwaves for override signals from the ground control station 150. The manager 108 scrutinizes the format, content, and other aspects of the override signal to adequately verify its validity. Via the transceiver 104, the manger 108 may optionally request the ground control station 150 to re-send and reconfirm the override signal, or institute other guarantees of security.

Next, responsive to detecting the override input, the module 102 performs step 408. Namely, the manager 108 deactivates the pilot controls 116, effectively disabling on-board control of the aircraft flight systems 120. This is achieved by activating the relay 118, or by transmitting a message instructing the master computer 114 to ignore input from the pilot controls 116. The deactivated pilot controls include those subject to management by the autopilot 112 (to prevent hijackers from overriding the autopilot's control of the aircraft), and may additionally include any or all additional pilot controls for which deactivation contributes to neutralizing hijackers. Also in step 408, the manager 108 deactivates on-board control of the autopilot 112, still leaving the autopilot's functionality intact. As one example, this may be achieved by disabling the autopilot's keypad, such as repeatedly submitting an invalid or overriding input to the keypad. In step 410, the manager 108 deactivates some or all of the aircraft's communications capability. For instance, step 410 may deactivate the aircraft's voice radios, preventing communication of threats and demands by the hijackers. Step 410 may also deactivate on-board telephones in the passenger compartment. Step 410 is optional, however, and the module 102 may be programmed to perform this step or not, depending upon the nature of the intended application. Alternatively, the manager 108 may perform this step only in response to specific direction from the ground control station 150.

Next, the manager 108 in step 412 inputs flight path and landing instructions to the autopilot 112 to guide the aircraft to a safe landing. At this point, the pilot controls 116 are useless to the pilots, hijackers, or anyone else in the cockpit. Step 412 may be performed in a number of different ways. Namely, the manager 108 may utilize preprogrammed instructions to land the airplane, or obtain instructions from the ground control station 150.

The use of preprogrammed instructions are discussed first. Here, the manager 108 self-identifies flight routing and landing instructions meeting certain predetermined qualifications. Self-identification may be used initially, or alternatively, as a last resort in the event that flight routing and landing instructions do not arrive or cannot be obtained from the ground control station 150. In this case, the manager 108 may obtain input from the position locator 106, compare this value to a predetermined list of approved landing airports, and identify the nearest suitable airport.

There are many advantages to exclusively listing military installations as the pre approved landing airports, such as: (1) avoiding disruption of other traffic at commercial airports, (2) providing a secure environment in which to apprehend the hijackers, (3) guaranteeing sufficient runway length, etc. To identify a suitable airport, many factors may be considered, such as the proximity to aircraft's present position, runway length, availability of emergency equipment, weather, type of available instrument approach, suitability to the aircraft's flight and landing properties, etc. In planning the flight routing to the selected airport, the manager 108 may utilize approved "victor" airways, GPS direct routing, predetermined holding patterns, standard instrument departures (SIDs), standard arrival (STAR) procedures, or another safe flight path. In planning the landing at the identified airport, the manager 108 may select and utilize an approved instrument approach procedure, for example. In the event the manager 108 cannot complete its planning of flight routing and landing, the manager 108 may contact the ground control station 150 for instructions.

As mentioned above, step 412 may also be performed according to flight routing and landing instructions received from the ground control station 150. In one example, instructions are received from the ground control station 150. In another example, the manager 108 actively requests such instructions responsive to the override input. In still another example, the manager 108 requests/honors such instructions only if self-planning (as discussed above) cannot be conducted. In any case, ground initiated flight routing and landing instructions may include, for example, routing to an initial approach fix and an instrument approach procedure to be executed upon arrival at the approach fix. To aid the ground control station 150 in planning the flight, the module 102 transmits various aircraft condition information to the ground control station 150. This information may be transmitted in step 412, or to give ground personnel greater time to plan the flight, an earlier time such as step 406. The aircraft condition information includes airspeed, fuel remaining, altitude, position, attitude, heading, engine condition, and other data needed to plan the remaining flight. If the module 102 fails to obtain or confirm instructions from the ground control station 150, the manager 108 may resort to self-planning of its flight routing and landing as described above.

In any case, the manager 108 provides flight routing and landing instructions to the autopilot in the form of attitude, altitude, heading, airspeed, GPS location, victor airway, VOR to/from, approach intercept instructions, approach identifier, or other information depending upon the type, make/model, and age of autopilot being used.

In addition to the flight routing and landing instructions as previously described, step 412 may also involve the manager 108 receiving and/or obtaining further, manual commands to individually implement by manipulating the aircraft flight systems. For instance, the ground control station 150 may transmit instructions to individually manipulate aircraft controls such as one or more of the following: control yoke, rudder pedals, condition or other power levers, flap input lever, and landing gear selectors. For instance, these instructions may represent movements beyond those capable of being implemented by the autopilot. In addition, further actions not associated with the autopilot may be implemented, such as individual manipulation of the brakes, reverse thrust (or beta mode), spoilers, dive brakes, nose-wheel steering, and the like.

After step 412, the manager 108 (optionally) downloads the latest data from the FDR 132 and CVR 130 and forwards such information the ground control station 150. This preserves the CVR and FDR data in anticipation of possible loss of the aircraft. This step is optional, however, and the module 102 may be programmed to perform this step or not, depending upon the nature of the intended application. In situations where the FDR 132 and/or CVR 130 cannot output data while they are recording data, circuitry or software may be implemented to provide a suitable solution such as providing redundant CVRs and FDRs, implementing CVR/FDR units with read/write multitasking capability, etc.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for preventing hijacking of an aircraft, comprising operations of:
   providing a hijacking intervention module aboard an aircraft having an autopilot system;
   the module sensing a predetermined override input;
   responsive to the sensing of the predetermined override input, the module performing operations comprising:
     deactivating on-board control of predetermined aircraft flight systems;
     deactivating on-board control of the autopilot system;
     directing the autopilot system to fly the aircraft to a landing.

2. The method of claim 1, the operations responsive to the sensing of the predetermined override input further comprising:
   receiving manual commands from at least one remote guidance facility, the manual commands comprising instructions to manually manipulate specified aircraft flight systems.

3. The method of claim 2, the specified aircraft flight systems comprising one or more of the following: rudder, elevator, engine power, flaps, landing gear, brakes, reverse thrust, spoilers, dive brakes, nosewheel steering.

4. The method of claim 1, the operation of directing the autopilot system comprising:
   the module receiving flight routing and landing instructions from at least one remote guidance facility;
   directing the autopilot system to fly the aircraft according to the flight routing and to land according to the landing instructions.

5. The method of claim 4, the operation of receiving flight routing and landing instructions comprising:
   receiving the flight routing and landing instructions via satellite relay.

6. The method of claim 4, the operation of receiving flight routing and landing instructions comprises receiving encrypted flight routing and landing instructions.

7. The method of claim 1, the operation of directing the autopilot system comprising:
   the module self-identifying flight routing and landing instructions meeting predetermined qualifications;

directing the autopilot system to fly the aircraft according to the self-identified flight routing and landing instructions.

8. The method of claim 7, the operation of the module self-identifying flight routing and landing instructions meeting predetermined qualifications including executing a pre-programmed automated routine to select a landing site meeting preset criteria.

9. The method of claim 1, the operation of directing the autopilot system comprising:
   determining whether flight routing and landing instructions have been received from at least one remote guidance facility;
   responsive to absence of flight routing and landing instructions from the remote guidance facility, the module self-identifying a flight routing and landing instructions meeting predetermined qualifications and then directing the autopilot system to fly the aircraft according to the flight routing and landing instructions.

10. The method of claim 9, the operations responsive to the sensing of the predetermined override input further comprising:
   attempting to obtain flight routing and landing instructions from the remote guidance facility.

11. The method of claim 1, the operation of directing the autopilot system comprising:
   the module attempting to self-identify flight routing and landing instructions meeting predetermined qualifications;
   responsive to absence of successful completion of the self-identifying of flight routing and landing instructions, the module obtaining flight routing and landing instructions from at least one remote guidance facility and directing the autopilot system to fly the aircraft according to the flight routing and to land according to the landing instructions.

12. The method of claim 1, the operation of sensing the predetermined override input comprising: the module receiving a predetermined override signal transmitted by a remote guidance facility.

13. The method of claim 1, the operation of sensing the predetermined override input comprising:
   the module detecting activation of a panic button aboard the aircraft.

14. The method of claim 1, the operations responsive to the sensing of the predetermined override input further comprising:
   deactivating aircraft communications equipment.

15. The method of claim 1, the operations further comprising assembling and transmitting accident reconstruction information to a remote station, said information including one or more of the following:
   data stored by an on-board flight data recorder;
   data stored by an on-board cockpit voice recorder.

16. The method of claim 1, the operations further comprising assembling and transmitting aircraft condition information to the remote guidance facility, said information comprising one or more of the following: airspeed, fuel remaining, altitude, position, attitude, heading, engine condition.

17. The method of claim 1,
   the operations further comprising providing a relay interposed between pilot controls and the predetermined aircraft flight control systems;
   where the operation of deactivating on-board control of the predetermined aircraft flight systems is performed by operating the relay to electrically disconnect the pilot controls from the predetermined aircraft flight systems.

18. A signal-bearing medium tangibly embodying a program of machine-readable instructions executable by a hijacking intervention module aboard an aircraft having an autopilot system to perform a method for preventing hijacking of the aircraft, the operations comprising:
   sensing a predetermined override input;
   responsive to the sensing of the predetermined override input, performing operations comprising:
      deactivating on-board control of predetermined aircraft flight systems;
      deactivating on-board control of the autopilot system;
      directing the autopilot system to fly the aircraft to a landing at a landing site.

19. The medium of claim 18, the operations responsive to the sensing of the predetermined override input further comprising:
   receiving manual commands from at least one remote guidance facility, the manual commands comprising instructions to manually manipulate specified aircraft flight systems.

20. The medium of claim 19, the specified aircraft flight systems comprising one or more of the following: rudder, elevator, engine power, flaps, landing gear, brakes, reverse thrust, spoilers, dive brakes, nosewheel steering.

21. The medium of claim 18, the operation of directing the autopilot system comprising:
   the module receiving flight routing and landing instructions from at least one remote guidance facility;
   directing the autopilot system to fly the aircraft according to the flight routing and to land according to the landing instructions.

22. The medium of claim 18, the operation of directing the autopilot system comprising:
   the module self-identifying flight routing and landing instructions meeting predetermined qualifications;
   directing the autopilot system to fly the aircraft according to the self-identified flight routing and landing instructions.

23. The medium of claim 22, the operation of the module self-identifying flight routing and landing instructions meeting predetermined qualifications including executing a pre-programmed automated routine to select a landing site meeting preset criteria.

24. The medium of claim 18, the operation of directing the autopilot system comprising:
   determining whether flight routing and landing instructions have been received from at least one remote guidance facility;
   responsive to absence of flight routing and landing instructions from the remote guidance facility, the module self-identifying a flight routing and landing instructions meeting predetermined qualifications and then directing the autopilot system to fly the aircraft according to the flight routing and landing instructions.

25. The medium of claim 24, the operations responsive to the sensing of the predetermined override input further comprising:
   attempting to obtain flight routing and landing instructions from the remote guidance facility.

26. The medium of claim 18, the operation of directing the autopilot system comprising:
   the module attempting to self-identify flight routing and landing instructions meeting predetermined qualifications;

responsive to absence of successful completion of the self-identifying of flight routing and landing instructions, the module obtaining flight routing and landing instructions from at least one remote guidance facility and directing the autopilot system to fly the aircraft according to the flight routing and to land according to the landing instructions.

27. The medium of claim 18, the operation of sensing the predetermined override input comprising:

the module receiving a predetermined override signal transmitted by a remote guidance facility.

28. The medium of claim 18, the operation of sensing the predetermined override input comprising:

the module detecting activation of a panic button aboard the aircraft.

29. The medium of claim 18, the operations responsive to the sensing of the predetermined input signal further comprising:

deactivating aircraft communications equipment.

30. The medium of claim 18, the operations further comprising assembling and transmitting accident reconstruction information to a remote station, said information including one or more of the following:

data stored by an on-board flight data recorder;

data stored by an on-board cockpit voice recorder.

31. The medium of claim 18, the operations further comprising assembling and transmitting aircraft condition information to the remote guidance facility, said information comprising one or more of the following: airspeed, fuel remaining, altitude, position, attitude, heading, engine condition.

32. The medium of claim 18, a relay being interposed between pilot controls and the predetermined aircraft flight control systems, the operation of deactivating on-board control of the predetermined aircraft flight systems comprising is performed by operating the relay to electrically disconnect the pilot controls from the predetermined aircraft flight systems.

33. A logic circuit of multiple interconnected electrically conductive elements configured to perform operations to prevent hijacking of an aircraft by operating a hijacking intervention module aboard the aircraft, the operations comprising:

sensing a predetermined override input;

responsive to the sensing of the predetermined override input, performing operations comprising:

deactivating on-board control of predetermined aircraft flight systems;

deactivating on-board control of the autopilot system;

directing the autopilot system to fly the aircraft to a landing.

34. An anti-hijacking system for use in an aircraft having an autopilot system, comprising:

a transceiver to communicate with remote stations;

a manual panic input;

a manager, coupled to the transceiver and the manual panic input, programmed to perform operations comprising:

sensing a predetermined override input comprising one or more of the following:

activation of the manual panic input, receipt of a predetermined override signal from a remote guidance facility via the transceiver;

responsive to the sensing of the predetermined override input, the manager performing operations comprising:

deactivating on-board control of predetermined aircraft flight systems;

deactivating on-board control of the autopilot system;

directing the autopilot system to fly the aircraft to a landing.

35. The apparatus of claim 34, the manager being further programmed such that the operations responsive to the sensing of the predetermined override input further comprise:

receiving manual commands from at least one remote guidance facility, the manual commands comprising instructions to manually manipulate specified aircraft flight systems.

36. The apparatus of claim 35, the manager being programmed such that the specified aircraft flight systems comprise one or more of the following: rudder, elevator, engine power, flaps, landing gear, brakes, reverse thrust, spoilers, dive brakes, nosewheel steering.

37. The apparatus of claim 34, the manual panic input comprising a portable remote control switch.

38. The apparatus of claim 34, the manager including an input coupled to an on-board aircraft master computer, the manager being further programmed to collect aircraft condition information from the master computer and operate the transceiver to transmit the collected information to a remote station, the aircraft condition information comprising one or more of the following: airspeed, fuel remaining, altitude, position, attitude, heading, engine condition.

39. The apparatus of claim 34, further comprising a relay coupled between pilot controls and the predetermined aircraft flight control systems;

the manager being programmed such that the operation of deactivating on-board control of the predetermined aircraft flight systems comprises activating the relay to electrically disconnect the pilot controls from the predetermined aircraft flight systems.

40. The apparatus of claim 34, further comprising:

a source of position information comprising at least one of the following: a position locating device, an interface to a position locating device;

the manager being further programmed to collect position information from the source and operate the transceiver to transmit the collected position information to a remote station.

41. The apparatus of claim 34, the manager programmed such that the operation of directing the autopilot system comprises:

receiving flight routing and landing instructions from a remote guidance facility;

directing the autopilot system to fly the aircraft according to the flight routing and to land according to the landing instructions.

42. The apparatus of claim 41, the manager programmed such that the operation of receiving flight routing and landing instructions comprises:

receiving the flight routing and landing instructions via satellite relay.

43. The apparatus of claim 34, the manager programmed such that the operation of receiving flight routing and landing instructions comprises receiving encrypted flight routing and landing instructions.

44. The apparatus of claim 34, the manager programmed such that the operation of directing the autopilot system comprises:

the module self-identifying flight routing and landing instructions meeting predetermined qualifications;

directing the autopilot system to fly the aircraft according to the self-identified flight routing and landing instructions.

45. The apparatus of claim 44, the operation of the module self-identifying flight routing and landing instructions meeting predetermined qualifications including executing a pre-programmed automated routine to select a landing site meeting preset criteria.

46. The apparatus of claim 34, the manager programmed such that the operation of directing the autopilot system comprises:
   determining whether flight routing and landing instructions have been received from at least one remote guidance facility;
   responsive to absence of flight routing and landing instructions from the remote guidance facility, the module self-identifying a flight routing and landing instructions meeting predetermined qualifications and then directing the autopilot system to fly the aircraft according to the flight routing and landing instructions.

47. The apparatus of claim 46, the manager programmed such that the operations responsive to the sensing of the predetermined override input further comprises:
   attempting to obtain flight routing and landing instructions from the remote guidance facility.

48. The apparatus of claim 34, the manager programmed such that the operation of directing the autopilot system comprises:
   attempting to self-identify flight routing and landing instructions meeting predetermined qualifications;
   responsive to absence of successful completion of the self-identifying of flight routing and landing instructions, obtaining flight routing and landing instructions from at least one remote guidance facility and directing the autopilot system to fly the aircraft according to the flight routing and to land according to the landing instructions.

49. The apparatus of claim 34, the manager programmed such that the operation of sensing the predetermined override input comprises:
   the module receiving a predetermined override signal transmitted by a remote guidance facility.

50. The apparatus of claim 34, the manager programmed such that the operation of sensing the predetermined override input comprises:
   the module detecting activation of a panic button aboard the aircraft.

51. The apparatus of claim 34, the manager programmed such that the operations responsive to the sensing of the predetermined override input further comprise:
   deactivating aircraft communications equipment.

52. The apparatus of claim 34, the manager programmed such that the operations further comprise assembling and transmitting accident reconstruction information to a remote station, said information including one or more of the following:
   data stored by an on-board flight data recorder;
   data stored by an on-board cockpit voice recorder.

53. The apparatus of claim 34, the manager programmed such that the operations further comprise assembling and transmitting aircraft condition information to the remote guidance facility, said information comprising one or more of the following: airspeed, fuel remaining, altitude, position, attitude, heading, engine condition.

54. The apparatus of claim 34, the transceiver including a transmitter and receiver configured to exchange data via satellite.

55. An anti-hijacking system for use in an aircraft having an autopilot system, comprising:
   first means for communicating with remote stations;
   second means for receiving manual panic input;
   processing means, coupled to the first and second means, for operations comprising:
      recognizing occurrence of one or more predetermined override signals arising from one or more of the following: activation of the second means, receipt of predetermined override signals from one or more remote stations via the first means;
      responsive to the receiving of one or more predetermined override signals, the processor performing operations comprising:
      deactivating on-board control of aircraft flight systems;
      deactivating on-board control of the autopilot system;
      directing the autopilot system to fly the aircraft to a landing at a landing site.

* * * * *